United States Patent
Okano et al.

(10) Patent No.: US 10,059,208 B2
(45) Date of Patent: Aug. 28, 2018

(54) BRAKING CONTROL APPARATUS AND BRAKING CONTROL METHOD FOR VEHICLE

(71) Applicant: TOYOTA JIDOSHA KABUSHIKI KAISHA, Toyota-shi, Aichi-ken (JP)

(72) Inventors: Takahiro Okano, Chiryu (JP); Daisuke Nakata, Seto (JP); Yusuke Kamiya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 15/111,697

(22) PCT Filed: Jan. 26, 2015

(86) PCT No.: PCT/IB2015/000063
§ 371 (c)(1),
(2) Date: Jul. 14, 2016

(87) PCT Pub. No.: WO2015/114438
PCT Pub. Date: Aug. 6, 2015

(65) Prior Publication Data
US 2016/0325628 A1 Nov. 10, 2016

(30) Foreign Application Priority Data

Jan. 28, 2014 (JP) .................. 2014-013604

(51) Int. Cl.
*B60L 7/26* (2006.01)
*B60K 6/445* (2007.10)
(Continued)

(52) U.S. Cl.
CPC ............... *B60L 7/26* (2013.01); *B60K 6/445* (2013.01); *B60T 1/10* (2013.01); *B60T 7/042* (2013.01);
(Continued)

(58) Field of Classification Search
CPC ......... B60L 7/26; B60W 20/14; B60W 10/08; B60W 10/184; B60W 30/18109;
(Continued)

(56) References Cited

U.S. PATENT DOCUMENTS

2004/0054450 A1 3/2004 Nakamura et al.
2004/0084959 A1* 5/2004 Kusano ................... B60T 8/266
303/119.2

(Continued)

FOREIGN PATENT DOCUMENTS

JP 2004-155403 A 6/2004
JP 2010-215084 A 9/2010

*Primary Examiner* — Mary Cheung
(74) *Attorney, Agent, or Firm* — Oliff PLC

(57) ABSTRACT

A braking control apparatus for a vehicle, the vehicle including a drive regeneration imparting device (10) and a hydraulic braking system (20), the drive regeneration imparting device being configured to impart a driving force or a regenerative braking force to the vehicle, the hydraulic braking system being configured to impart a hydraulic braking force to the vehicle by adjusting a hydraulic pressure in a wheel cylinder provided in a wheel, the braking control apparatus includes: an electronic control unit (100) configured to, when the hydraulic braking force is reduced based on a reduction in brake operation amount that is an operation amount of a brake operation member, execute a correction process, the correction process being a process of reducing the regenerative braking force that is being imparted to the vehicle by the drive regeneration imparting device.

15 Claims, 9 Drawing Sheets

(51) Int. Cl.
  *B60T 1/10* (2006.01)
  *B60T 7/04* (2006.01)
  *B60T 13/14* (2006.01)
  *B60T 13/68* (2006.01)
  *B60W 30/18* (2012.01)
  *B60W 10/08* (2006.01)
  *B60W 10/184* (2012.01)
  *B60W 20/14* (2016.01)

(52) U.S. Cl.
  CPC .......... *B60T 13/142* (2013.01); *B60T 13/686* (2013.01); *B60W 10/08* (2013.01); *B60W 10/184* (2013.01); *B60W 20/14* (2016.01); *B60W 30/18109* (2013.01); *B60W 30/18127* (2013.01); *B60Y 2300/89* (2013.01); *Y02T 10/6239* (2013.01); *Y10S 903/947* (2013.01)

(58) Field of Classification Search
  CPC ..... B60T 13/686; B60T 13/142; B60K 6/445; Y01S 903/947; Y02T 10/6239; B60Y 2300/89
  See application file for complete search history.

(56) References Cited

U.S. PATENT DOCUMENTS

| | | | | |
|---|---|---|---|---|
| 2004/0108770 A1* | 6/2004 | Maki | .......................... | B60L 7/26 303/116.4 |
| 2007/0228812 A1* | 10/2007 | Kokubo | .................... | B60T 1/10 303/3 |
| 2008/0116743 A1* | 5/2008 | Jeon | .......................... | B60L 3/10 303/152 |
| 2012/0074767 A1* | 3/2012 | Nishio | ...................... | B60T 1/10 303/3 |

* cited by examiner

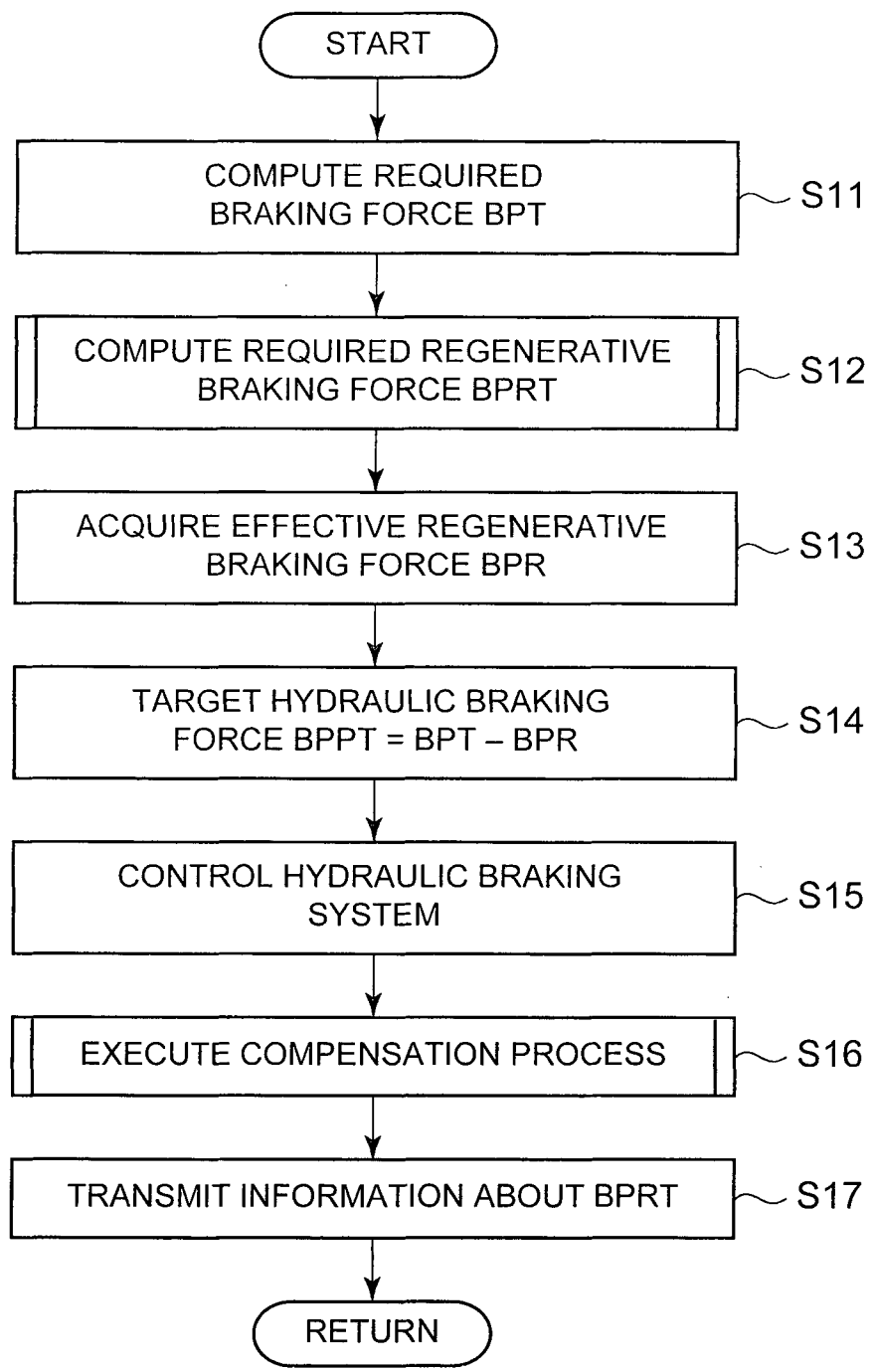

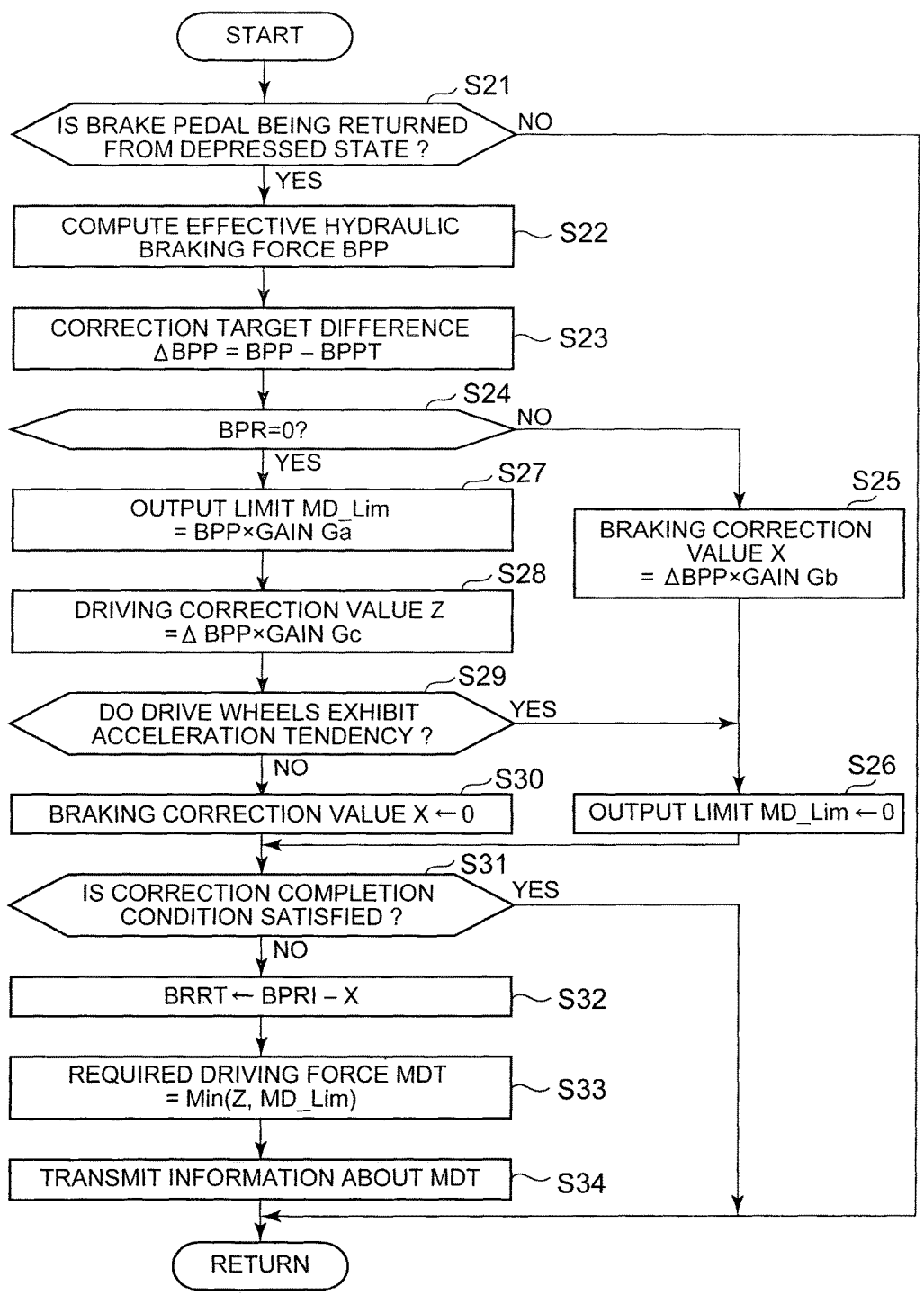

FIG. 7

| CONDITION 1 | CORRECTION TARGET DIFFERENCE ΔBPP BECOMES SMALLER THAN DETERMINATION VALUE ΔBPPTh |
|---|---|
| CONDITION 2 | CORRECTION TARGET DIFFERENCE ΔBPP BECOMES SMALLER THAN DETERMINATION VALUE ΔBPPTh BASED ON MAXIMUM VALUE ΔBPP_max |
| CONDITION 3 | DECELERATION DVS OF VEHICLE HAS DECREASED |
| CONDITION 4 | REDUCTION IN WC PRESSURE Pwc HAS BEEN DETECTED |
| CONDITION 5 | ELAPSED TIME T FROM TIMING OF START OF RETURN FROM DEPRESSED STATE ELAPSES PRESCRIBED TIME TTh (THAT IS, CORRECTION PERIOD ELAPSES) |

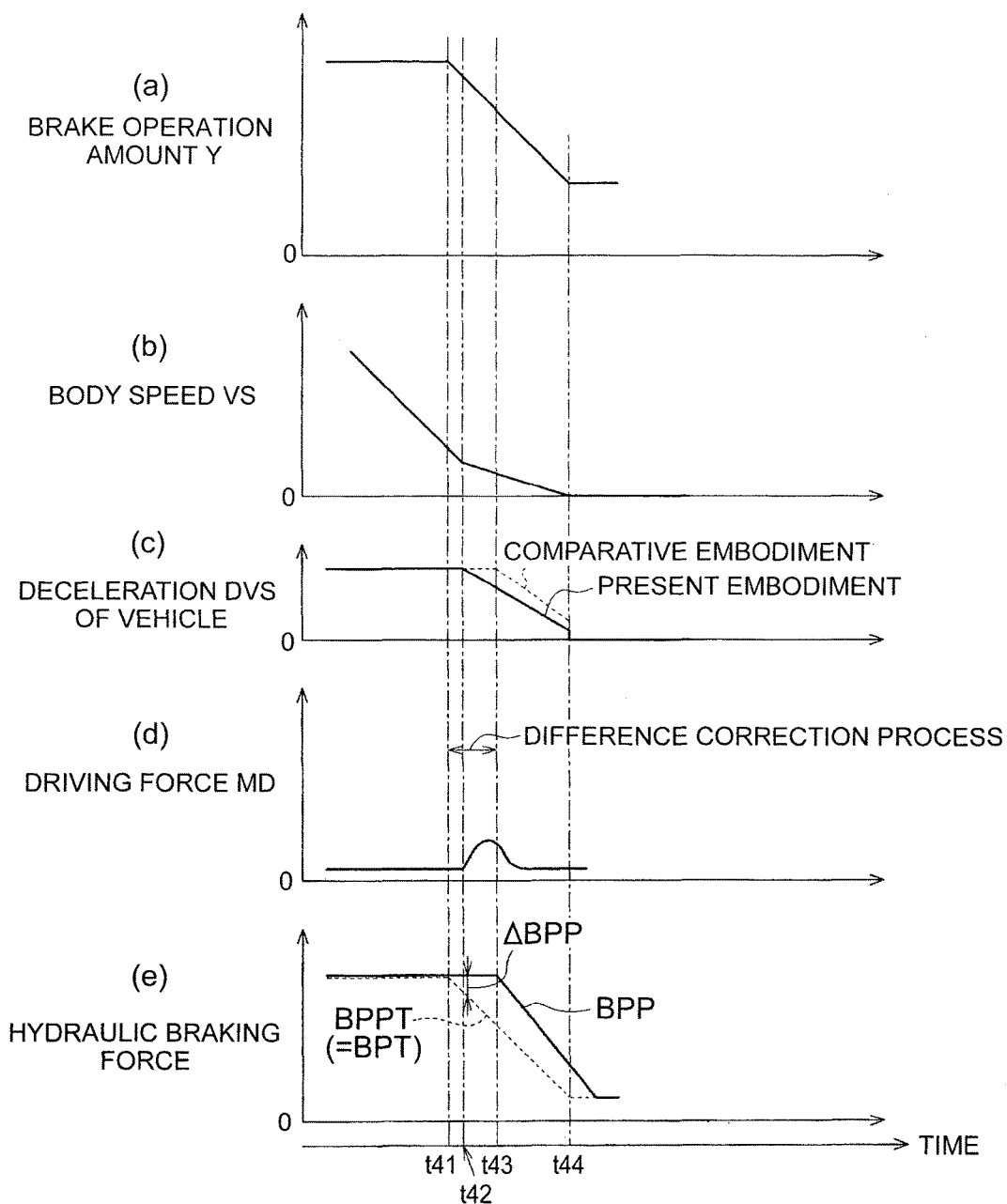

BRAKING CONTROL APPARATUS AND BRAKING CONTROL METHOD FOR VEHICLE

BACKGROUND OF THE INVENTION

1. Field of the Invention

The invention relates to a braking control apparatus and braking control method for a vehicle, which control a regenerative braking force and a hydraulic braking force on the basis of a required braking force according to a brake operation amount.

2. Description of Related Art

Japanese Patent Application Publication No. 2010-215084 (JP 2010-215084 A) describes one example of a so-called by-wire hydraulic braking system. In such a hydraulic braking system, a master cylinder in which hydraulic pressure is generated in accordance with a brake operation amount is separated from each of wheel cylinders respectively provided in wheels. Therefore, when a hydraulic pressure in each wheel cylinder is increased on the basis of driver's brake operation, brake fluid in an amount appropriate to a required hydraulic braking force is supplied into each wheel cylinder through operations of pumps or valves. Thus, the hydraulic pressure in each wheel cylinder, that is, the hydraulic braking force appropriate to the required hydraulic braking force, is imparted to a vehicle.

Such a hydraulic braking system may be provided in a vehicle including a drive motor that is one example of a drive regeneration imparting device that is able to impart regenerative braking force. For example, in such a vehicle, a required braking force according to a driver's brake operation amount is computed, and it is determined whether the regenerative braking force that is being imparted to the vehicle by the drive motor is smaller than the required braking force. When the regenerative braking force is smaller than the required braking force, a required hydraulic braking force is computed in accordance with a difference obtained by subtracting the regenerative braking force from the required braking force, and the hydraulic braking system is controlled so that the hydraulic braking force is brought close to the required hydraulic braking force.

As described above, in the hydraulic braking system that adjusts the braking force of the vehicle as a whole in cooperation with the drive motor, a computing process of computing a required hydraulic braking force is executed by a controller, and then the hydraulic braking system is operated in order to bring the hydraulic braking force close to the required hydraulic braking force that is the result of the computing process. Therefore, the response speed of the hydraulic braking force decreases for the necessity of such a computing process, so there is a concern that drivability decreases. That is, in reducing the hydraulic braking force on the basis of a reduction in driver's brake operation amount, the start of reduction in the hydraulic braking force delays, so the deceleration of the vehicle is difficult to decrease.

SUMMARY OF THE INVENTION

The invention provides a braking control apparatus and braking control method for a vehicle, which are able to improve drivability by early reducing the deceleration of the vehicle in reducing a hydraulic braking force in accordance with a reduction in brake operation amount.

An aspect of the invention provides a braking control apparatus for a vehicle. The vehicle includes a drive regeneration imparting device and a hydraulic braking system. The drive regeneration imparting device is configured to impart a driving force or a regenerative braking force to the vehicle. The hydraulic braking system is configured to impart a hydraulic braking force to the vehicle by adjusting a hydraulic pressure in a wheel cylinder provided in a wheel. The braking control apparatus includes an electronic control unit. The electronic control unit is configured to, when the hydraulic braking force is reduced based on reduction in brake operation amount that is an operation amount of a brake operation member, execute a correction process. The correction process is a process of reducing the regenerative braking force that is being imparted to the vehicle by the drive regeneration imparting device.

Generally, the response speed of the driving force or regenerative braking force that the drive regeneration imparting device imparts to the vehicle is higher than the response speed of the hydraulic braking force that the hydraulic braking system imparts to the vehicle. With the above configuration, when the brake operation amount is reduced through driver's brake operation and then the hydraulic braking force that is being imparted to the vehicle is reduced, the regenerative braking force that is imparted to the vehicle by the drive regeneration imparting device is corrected to reduce through execution of the correction process. As a result, it is possible to bring the mode of reduction in the sum of the regenerative braking force and the hydraulic braking force close to the mode of reduction in the required braking force according to the brake operation amount. That is, because a delay in response of the hydraulic braking force is compensated by the regenerative braking force having a higher response speed than the hydraulic braking force, the braking force of the vehicle is early reduced on the basis of a reduction in the brake operation amount. Thus, in reducing the hydraulic braking force in accordance with a reduction in the brake operation amount, it is possible to improve drivability by early reducing the deceleration of the vehicle.

In the braking control apparatus, the electronic control unit may be configured to increase a required hydraulic braking force as a difference between a required braking force and the regenerative braking force increases, the required braking force may be a braking force according to the brake operation amount, the regenerative braking force may be a braking force that is being imparted to the vehicle by the drive regeneration imparting device. In this case, the electronic control unit may be configured to, when the hydraulic braking force is reduced based on a reduction in the brake operation amount, reduce the regenerative braking force that is being, imparted to the vehicle by the drive regeneration imparting device through execution of the correction process as a correction target difference increases. The correction target difference may be a difference between the computed required hydraulic braking force and the hydraulic braking force that is being imparted to the vehicle by the hydraulic braking system.

With the above configuration, through the execution of the correction process, the regenerative braking force is reduced by a larger amount as the correction target difference increases. Therefore, even in a state where the hydraulic braking force is not reduced soon, it is possible to bring the mode of reduction in the sum of the regenerative braking force and the hydraulic braking force close to the mode of reduction in the required braking force according to the brake operation amount. Thus, it is possible to early bring the deceleration of the vehicle close to the deceleration that is required by the driver.

Incidentally, when the brake operation amount is reduced, there is a case where the regenerative braking force is not being imparted to the vehicle by the drive regeneration imparting device. When the brake operation amount is reduced in this state, it is not possible to compensate a delay in response of the hydraulic braking force with a reduction in the regenerative braking force.

The deceleration of the vehicle depends on the difference between the braking force and driving force of the vehicle. Therefore, in the braking control apparatus, the electronic control unit may be configured to, when the hydraulic braking force is reduced in accordance with a reduction in the brake operation amount in a situation that the regenerative braking force is not being imparted to the vehicle by the drive regeneration imparting device, execute, as the correction process, a process of increasing the driving force that the drive regeneration imparting device imparts to the vehicle. With this configuration, in a state where the regenerative braking force is not being imparted to the vehicle, when the hydraulic braking force is reduced by a reduction in the brake operation amount, the driving force that the drive regeneration imparting device imparts to the vehicle is increased. Thus, even in a period in which the hydraulic braking force is not reduced soon and the braking force of the vehicle as a whole is difficult to decrease, the driving force that is imparted to the vehicle is increased, so it is possible to reduce the deceleration of the vehicle. Thus, even when the brake operation amount is reduced at the time when the regenerative braking force is not being imparted to the vehicle, it is possible to improve drivability.

For example, in increasing the driving force through execution of the correction process, the driving force that is imparted to the vehicle by the drive regeneration imparting device may be increased as the correction target difference increases. With this configuration, through execution of the correction process, the driving force is increased by a larger amount as the correction target difference increases. Therefore, even in a period in which a reduction in the hydraulic braking force is not yet started and the braking force of the vehicle as a whole is difficult to decrease, it is possible to early bring the deceleration of the vehicle close to the deceleration that is required by the driver through an increase in the driving force resulting from execution of the correction process.

However, when the driving force is increased through execution of the correction process, if the driving force is increased excessively, there is a concern that the vehicle starts accelerating although the driver is carrying out brake operation and an accelerator pedal is not operated. Therefore, the electronic control unit may be configured to, when the driving force that the drive regeneration imparting device imparts to the vehicle is being increased through execution of the correction process, limit an increase in the driving force such that a deceleration tendency of the vehicle is kept. With this configuration, even when the driving force is increased through execution of the correction process, an excessive increase in the driving force is avoided. As a result, it is possible to suppress occurrence of a deviation between a behavior of the vehicle and a behavior that is required by the driver.

For example, the electronic control unit may be configured to, when the driving force that the drive regeneration imparting device imparts to the vehicle is being increased through execution of the correction process, reduce a limit value of an amount of increase in the driving force as the hydraulic braking force that is being imparted to the vehicle by the hydraulic braking system decreases. By employing this control configuration, an excessive increase in the driving force in a situation that the driving force that the drive regeneration imparting device imparts to the vehicle through execution of the correction process is being increased is suppressed. Therefore, by determining the limit value in this way, it is possible to implement the configuration of keeping the deceleration tendency of the vehicle during execution of the correction process.

When the drive wheel starts exhibiting an acceleration tendency while the driving force on the drive wheel of the vehicle is being increased through execution of the correction process, the vehicle accelerates in the end. Therefore, the electronic control unit may be configured to, when the driving force that the drive regeneration imparting device imparts to the vehicle through execution of the correction process is being increased, complete execution of the correction process on the condition that a wheel speed of a drive wheel to which the driving force is being imparted by the drive regeneration imparting device exhibits an acceleration tendency. With this configuration, before the vehicle actually starts accelerating through an increase in the driving force resulting from execution of correction control, it is possible to reduce the driving force. As a result, it is possible to suppress occurrence of a deviation between an actual behavior of the vehicle and a behavior that is required by the driver.

Incidentally, in a period in which the driving force is being increased through execution of the correction process, electric power is continuously supplied to the drive regeneration imparting device, so the load of the drive regeneration imparting device increases. Therefore, when it is predicted that execution of the correction process becomes unnecessary, the correction process may be quickly completed. Therefore, in the braking control apparatus, the electronic control unit may be configured to, when a predetermined completion condition is satisfied in a state where the driving force that the drive regeneration imparting device imparts to the vehicle through execution of the correction process is being increased, complete execution of the correction process. With this configuration, unnecessary execution of the correction process is suppressed, so it is possible to suppress an increase in the load of the drive regeneration imparting device.

When the correction target difference is small, it may be determined that a deviation between the required hydraulic braking force and the hydraulic braking force that is being imparted to the vehicle by the hydraulic braking system is small. Therefore, a determination value may be provided as a determination criterion as to whether a deviation between the required hydraulic braking force and the hydraulic braking force is small. In this case, the completion condition may include a condition that the correction target difference becomes smaller than the determination value. With this configuration, even in a state where the correction process is started in reducing the brake operation amount and then the driving force is increased, execution of the correction process is completed when the correction target difference becomes smaller than the determination value. Thus, the driving force is reduced, and electric power that is supplied to the drive regeneration imparting device decreases. Thus, it is possible to suppress an increase in the load of the drive regeneration imparting device.

It is assumed that a value at the time when the correction target difference becomes maximum after a start of the correction process is a correction target difference maximum value. In this case, the determination value may be reduced as the correction target difference maximum value decreases. With this configuration, it is possible to appropriately complete the correction process in response to the fact that the correction target difference has decreased.

A decrease in the deceleration of the vehicle in accordance with a reduction in the brake operation amount may be regarded as that the actual behavior of the vehicle becomes close to the behavior that is required by the driver who has reduced the brake operation amount. Therefore, the completion condition may include a condition that a deceleration of the vehicle decreases in accordance with a reduction in the brake operation amount. With this configuration, when it may be regarded that the actual behavior of the vehicle becomes close to the behavior that is required by the driver through execution of the correction process, it is possible to complete the correction process.

When the hydraulic pressure in the wheel cylinder is reduced in accordance with a reduction in the brake operation amount, a reduction in the hydraulic braking force of the vehicle is started. In this case, even when the correction process is not executed, it is possible to reduce the deceleration of the vehicle. Therefore, the completion condition may include a condition that a reduction of the hydraulic pressure in the wheel cylinder has been detected. With this configuration, when the hydraulic braking force is reduced on the basis of a reduction in the brake operation amount, it is possible to complete the correction process.

Although the response speed of the hydraulic braking force is low, but when a certain period elapses from when a reduction in the brake operation amount is started, the rate of reduction in the hydraulic braking force increases with a reduction in the required hydraulic braking force. In this way, when the rate of reduction in the hydraulic braking force increases, it is possible to reduce the deceleration of the vehicle with a reduction in the brake operation amount even when the correction process is not executed. Therefore, when a correction period is provided as a period according to a delay in response of the hydraulic braking force, the completion condition may include a condition that the correction period elapses after the correction process is started. With this configuration, when execution of the correction process is unnecessary, execution of the correction process is completed. Thus, the driving force is reduced, and electric power that is supplied to the drive regeneration imparting device decreases. Thus, it is possible to suppress an increase in the load of the drive regeneration imparting device.

In a so-called by-wire hydraulic braking system that is configured to interrupt an inside of a master cylinder that generates a hydraulic pressure according to the brake operation amount from an inside of the wheel cylinder, when the inside of the master cylinder is actually interrupted from the inside of the wheel cylinder, the response speed of the hydraulic braking force tends to decrease as compared to a hydraulic braking system in which the inside of the master cylinder communicates with the inside of the wheel cylinder. Therefore, the braking control apparatus may be applied to a controller for such a by-wire hydraulic braking system.

Another aspect of the invention provides a braking control method for a vehicle. The vehicle includes a drive regeneration imparting device, a hydraulic braking system and an electronic control unit. The drive regeneration imparting device is configured to impart a driving force or a regenerative braking force to the vehicle. The hydraulic braking system is configured to impart a hydraulic braking force to the vehicle by adjusting a hydraulic pressure in a wheel cylinder provided in a wheel. The braking control method includes, when the hydraulic braking force is reduced based on a reduction in brake operation amount that is an operation amount of a brake operation member, executing a correction process by the electronic control unit. The correction process is a process of reducing the regenerative braking force that is being imparted to the vehicle by the drive regeneration imparting device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a flowchart that illustrates a process routine that is executed at the time when brake operation is carried out;

FIG. 6 is a flowchart that illustrates a compensation process routine;

FIG. 7 is a table that shows a completion condition;

FIG. 9 is a timing chart at the time when the effective hydraulic braking force is reduced in accordance with a reduction in brake operation amount in a situation that the effective regenerative braking force is not being imparted to the vehicle, in which (a) shows changes in brake operation amount, (b) shows changes in body speed, (c) shows changes in the deceleration of the vehicle, (d) shows changes in driving force, and (e) shows changes in effective hydraulic braking force and target hydraulic braking force.

DETAILED DESCRIPTION OF EMBODIMENTS

Figure 1:
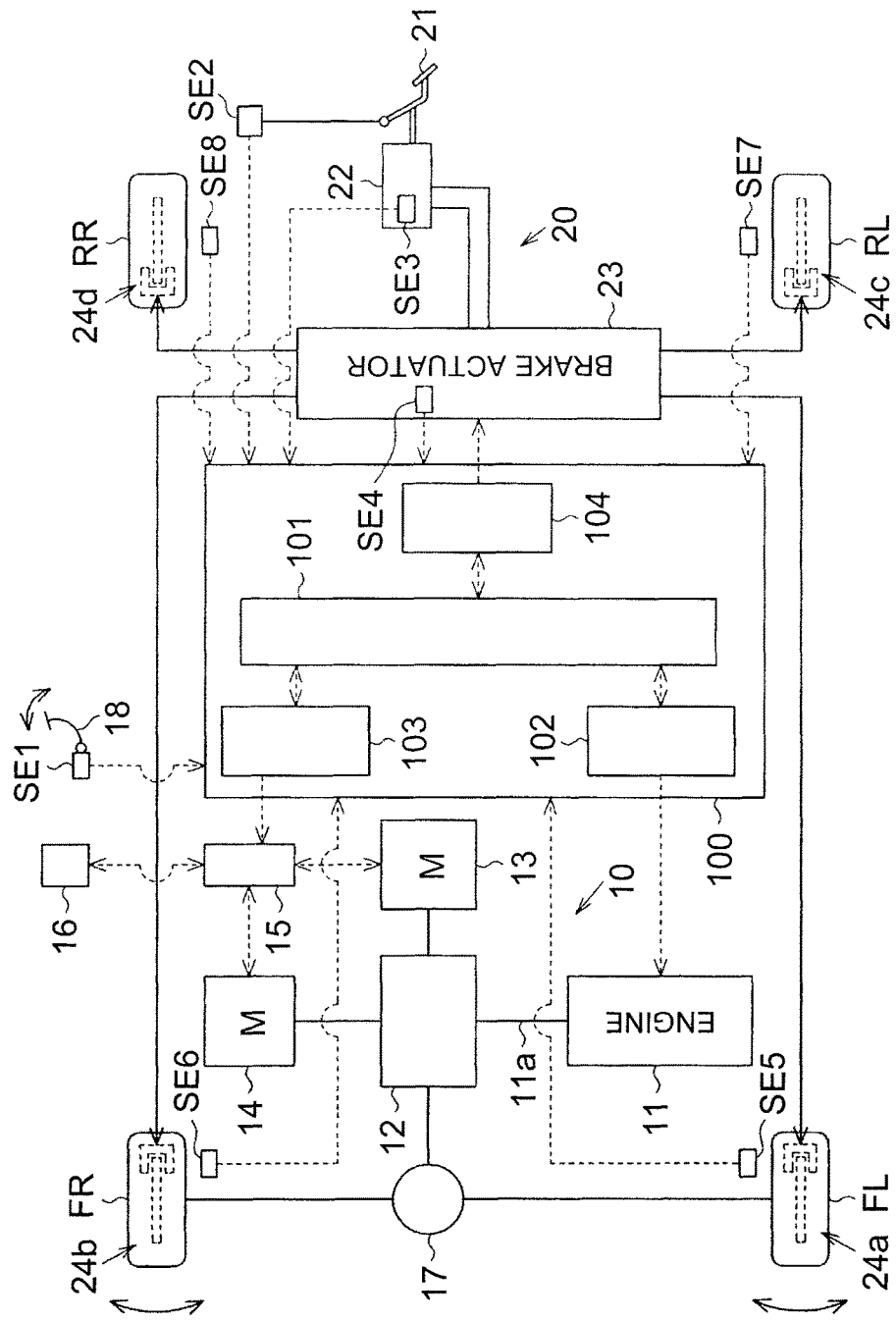
FIG. 1 is a block diagram that shows the schematic configuration of a hybrid vehicle including a controller that is one embodiment of an electronic control unit of a braking control apparatus for a vehicle.

Hereinafter, one example embodiment of a braking control apparatus for a vehicle will be described with reference to FIG. 1 to FIG. 9. FIG. 1 shows a hybrid vehicle including a controller 100 that is an electronic control unit of the braking control apparatus for a vehicle according to the present embodiment. As shown in FIG. 1, the hybrid vehicle includes two-motor hybrid system 10 and a hydraulic braking system 20. The hydraulic braking system 20 imparts a braking force (hydraulic braking force) to all wheels FR, FL, RR, RL.

The hybrid system 10 includes an engine 11. The engine 11 is operated by supplied fuel, such as gasoline. A first motor 13 and a second motor 14 are coupled to a crankshaft 11a of the engine 11 through a power transmission mechanism 12. The power transmission mechanism 12 includes a planetary gear train, and the like. The power transmission mechanism 12 transmits driving force from the engine 11 to the first motor 13 and the front wheels FR, FL. The front wheels FR, FL are drive wheels. When the second motor 14 is driven, the power transmission mechanism 12 transmits driving force from the second motor 14 to the front wheels FR, FL.

The first motor 13 generates electric power by using driving force transmitted via the power transmission mechanism 12. The electric power generated by the first motor 13 is supplied to a battery 16 via an inverter 15, and is stored in the battery 16.

The second motor 14 functions as a driving source of the vehicle when a driver operates an accelerator pedal 18. At this time, electric power is supplied from the battery 16 to the second motor 14 via the inverter 15. As a result, the driving force generated by the second motor 14 is transmitted to the front wheels FR, FL via the power transmission mechanism 12 and a differential 17. An accelerator operation amount sensor SE1 is provided near the accelerator pedal 18. The accelerator operation amount sensor SE1 outputs, to the controller 100, a signal according to an accelerator operation amount that is the operation amount of the accelerator pedal 18.

On the other hand, during brake operation in which the driver operates a brake pedal 21 as a brake operation member, power resulting from rotation of the front wheels FR, FL is transmitted to the second motor 14 through the differential 17 and the power transmission mechanism 12. At this time, the second motor 14 functions as a generator, and electric power generated by the second motor 14 is supplied to the battery 16 via the inverter 15 and is stored in the battery 16. The second motor 14 that generates electric power in this way imparts regenerative braking force according to the amount of electric power generated by itself to the vehicle. Thus, in the present embodiment, the second motor 14 constitutes an example of a drive regeneration imparting device that imparts a driving force or a regenerative braking force to the vehicle.

Figure 2:
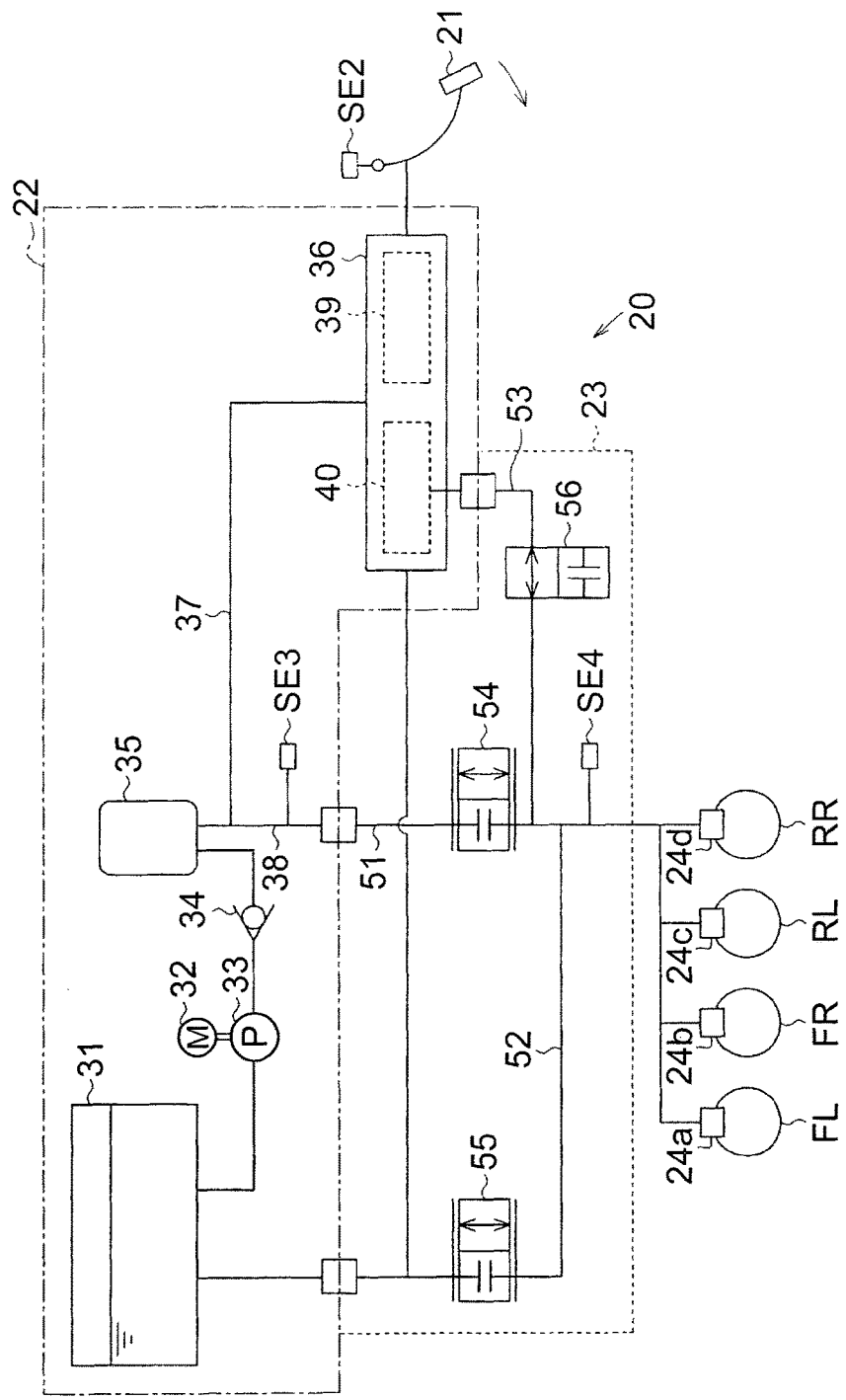
FIG. 2 is a block diagram that shows the schematic configuration of a hydraulic braking system.

Next, the hydraulic braking system 20 will be described with reference to FIG. 1 and FIG. 2. As shown in FIG. 1 and FIG. 2, the hydraulic braking system 20 is a so-called by-wire hydraulic braking system. That is, the hydraulic braking system 20 includes a hydraulic pressure generating device 22 and a brake actuator 23. A brake pedal 21 is drivably coupled to the hydraulic pressure generating device 22. The brake actuator 23 adjusts a wheel cylinder pressure (hereinafter, also referred to as WC pressure). The wheel cylinder pressure is a hydraulic pressure in each of wheel cylinders 24b, 24a, 24d, 24c of brake mechanisms respectively provided in the wheels FR, FL, RR, RL. The hydraulic braking system 20 includes a brake operation amount detection sensor SE2. The brake operation amount detection sensor SE2 detects the operation amount of the brake pedal 21.

The hydraulic pressure generating device 22 includes a reservoir tank 31 and a hydraulic pump 33. Brake fluid is stored in the reservoir tank 31. The hydraulic pump 33 uses a drive motor 32 as a driving source. The hydraulic pump 33 introduces brake fluid inside the reservoir tank 31, and supplies the introduced brake fluid to an accumulator 35 via a check valve 34. Thus, brake fluid increased in pressure by the hydraulic pump 33 and the check valve 34 is stored inside the accumulator 35.

A booster supply passage 37 and an actuator supply passage 38 are connected to the above accumulator 35. The booster supply passage 37 is used to supply brake fluid to a hydraulic booster 36. The actuator supply passage 38 is used to directly supply brake fluid to the brake actuator 23. An accumulator pressure detection sensor SE3 is connected to the actuator supply passage 38. The accumulator pressure detection sensor SE3 detects an accumulator pressure that is a brake hydraulic pressure inside the accumulator 35.

The hydraulic booster 36 includes a boost device 39 and a master cylinder 40. The boost device 39 boosts driver's operation force on the brake pedal 21 by utilizing the accumulator pressure inside the accumulator 35. A master cylinder pressure (hereinafter, also referred to as MC pressure) that is a hydraulic pressure according to the operation force boosted by the boost device 39 is generated in the master cylinder 40.

The brake actuator 23 includes a pressure increasing passage 51, a pressure reducing passage 52 and an emergency passage 53. The pressure increasing passage 51 connects the actuator supply passage 38 to each of the wheel cylinders 24a to 24d. The pressure reducing passage 52 connects each of the wheel cylinders 24a to 24d to the reservoir tank 31. The emergency passage 53 connects the master cylinder 40 to each of the wheel cylinders 24a to 24d. A supply valve 54 and a WC pressure detection sensor SE4 are provided in the pressure increasing passage 51. The supply valve 54 is a normally-closed linear electromagnetic valve. The WC pressure detection sensor SE4 detects the wheel cylinder pressure (hereinafter, also referred to as WC pressure) that is the hydraulic pressure in each of the wheel cylinders 24a to 24d. By adjusting the opening degree of the supply valve 54, it is possible adjust the amount of brake fluid that flows from the accumulator 35 into each of the wheel cylinders 24a to 24d. That is, as the opening degree of the supply valve 54 increases, the WC pressure in each of the wheel cylinders 24a to 24d increases, with the result that the hydraulic braking force on each of the wheels FR, FL, RR, RL is increased.

A drain, valve 55 is arranged in the pressure reducing passage 52. The drain valve 55 is a normally-closed linear electromagnetic valve. By adjusting the opening degree of the drain valve 55, the amount of brake fluid that flows out from each of the wheel cylinders 24a to 24d into the reservoir tank 31 is adjusted. That is, as the opening degree of the drain valve 55 increases, the WC pressure in each of the wheel cylinders 24a to 24d decreases, with the result that the hydraulic braking force on each of the wheels FR, FL, RR, RL is reduced.

A cut-off valve 56 is provided in the emergency passage 53. The cut-off valve 56 is a normally-open electromagnetic valve. When the cut-off valve 56 is closed, fluid communication between the master cylinder 40 and each of the wheel cylinders 24a to 24d is cut off, with the result that it is not possible to directly supply brake fluid inside the master cylinder 40 into each of the wheel cylinders 24a to 24d. On the other hand, when the cut-off valve 56 is open, the master cylinder 40 is communicated with each of the wheel cylinders 24a to 24d, with the result that brake fluid in an amount according to the MC pressure is supplied from the master cylinder 40 into each of the wheel cylinders 24a to 24d. Hydraulic braking force having a magnitude according to the WC pressure in each of the wheel cylinders 24b, 24a, 24d, 24c are imparted to a corresponding one of the wheels FR, FL, RR, RL. The cut-off valve 56 is closed when both the supply valve 54 and the drain valve 55 normally operate and the second motor 14 is able to impart an effective regenerative braking force BPR to the vehicle.

Next, the controller 100 will be described with reference to FIG. 1. As shown in FIG. 1, in addition to the accelerator operation amount sensor SE1, the brake operation amount detection sensor SE2, the accumulator pressure detection sensor SE3 and the WC pressure detection sensor SE4, wheel speed sensors SE6, SE5, SE8, SE7 are electrically connected to the controller 100. Each of the wheel speed sensors SE6, SE5, SE8, SE7 detects the wheel speed of a corresponding one of the wheels FR, FL, RR, RL. The controller 100 executes overall vehicle control on the basis of various pieces of detection information, which are detected by various detection systems, such as the sensors SE1 to SE8.

The controller 100 includes a power management computer 101, an engine control unit 102, a motor control unit 103 and a brake control unit 104. The engine control unit 102 controls the engine 11. The motor control unit 103 controls the first motor 13 and the second motor 14. The brake control unit 104 controls the hydraulic braking system 20.

When the driver carries out accelerator operation, the power management computer 101 computes a required power that is required of the engine 11 and a required power that is required of the second motor 14 on the basis of a traveling state of the vehicle. The power management computer 101 individually transmits control commands based on the computed required powers to the engine control unit 102 and the motor control unit 103.

When the driver carries out brake operation, the power management computer 101 transmits information about the required regenerative braking force to the motor control unit 103. The information is received from the brake control unit 104. The power management computer 101 receives information about the effective regenerative braking force from the motor control unit 103, and transmits information about the effective regenerative braking force to the brake control unit 104. The effective regenerative braking force is the regenerative braking force that is being imparted to the vehicle by the second motor 14.

When the vehicle decelerates as a result of driver's brake operation, the motor control unit 103 receives information about the required regenerative braking force from the power management computer 101. The motor control unit 103 computes the maximum value of the regenerative braking force that is allowed to be imparted to the front wheels FR, FL on the basis of the state of charge of the battery 16 and the wheel speed of each of the front wheels FR, FL (that is, the body speed of the vehicle) at that timing. When the maximum value of the regenerative braking force at that timing is larger than or equal to the required regenerative braking force, the motor control unit 103 causes the second motor 14 to generate electric power so that the effective regenerative braking force equal to the required regenerative braking force is imparted to the front wheels FR, FL. On the other hand, when the maximum value of the regenerative braking force at that timing is smaller than the required regenerative braking force, the motor control unit 103 causes the second motor 14 to generate electric power so that the effective regenerative braking force smaller than or equal to the maximum value of the regenerative braking force is imparted to the front wheels FR, FL. The motor control unit 103 transmits information about the effective regenerative braking force to the power management computer 101.

When the driver carries out brake operation, the brake control unit 104 computes a required braking force of the vehicle on the basis of the brake operation amount that is detected by the brake operation amount detection sensor SE2. At this time, the required braking force is increased as the brake operation amount increases. The brake control unit 104 computes the required regenerative braking force on the basis of the computed required braking force of the vehicle, and the like, and transmits information about the required regenerative braking force to the power management computer 101.

At this time, when the required braking force is equal to the effective regenerative braking force, the brake control unit 104 does not activate the hydraulic braking system 20. That is, the brake control unit 104 does not allow the hydraulic braking system 20 to impart the hydraulic braking force to the vehicle. On the other hand, when the effective regenerative braking force is smaller than the required braking force, the brake control unit 104 allows the hydraulic braking system 20 to impart the hydraulic braking force to the vehicle. The hydraulic braking force that is being imparted by the hydraulic braking system 20 to the vehicle is also referred to as effective hydraulic braking force.

Next, an example of cooperative control between the regenerative braking force and the hydraulic braking force when the vehicle brakes as a result of brake operation will be described with reference to the timing chart shown in FIG. 3. In this description, the sum of an effective regenerative braking force BPR and an effective hydraulic braking force BPP is referred to as effective braking force BPA.

Figure 3:
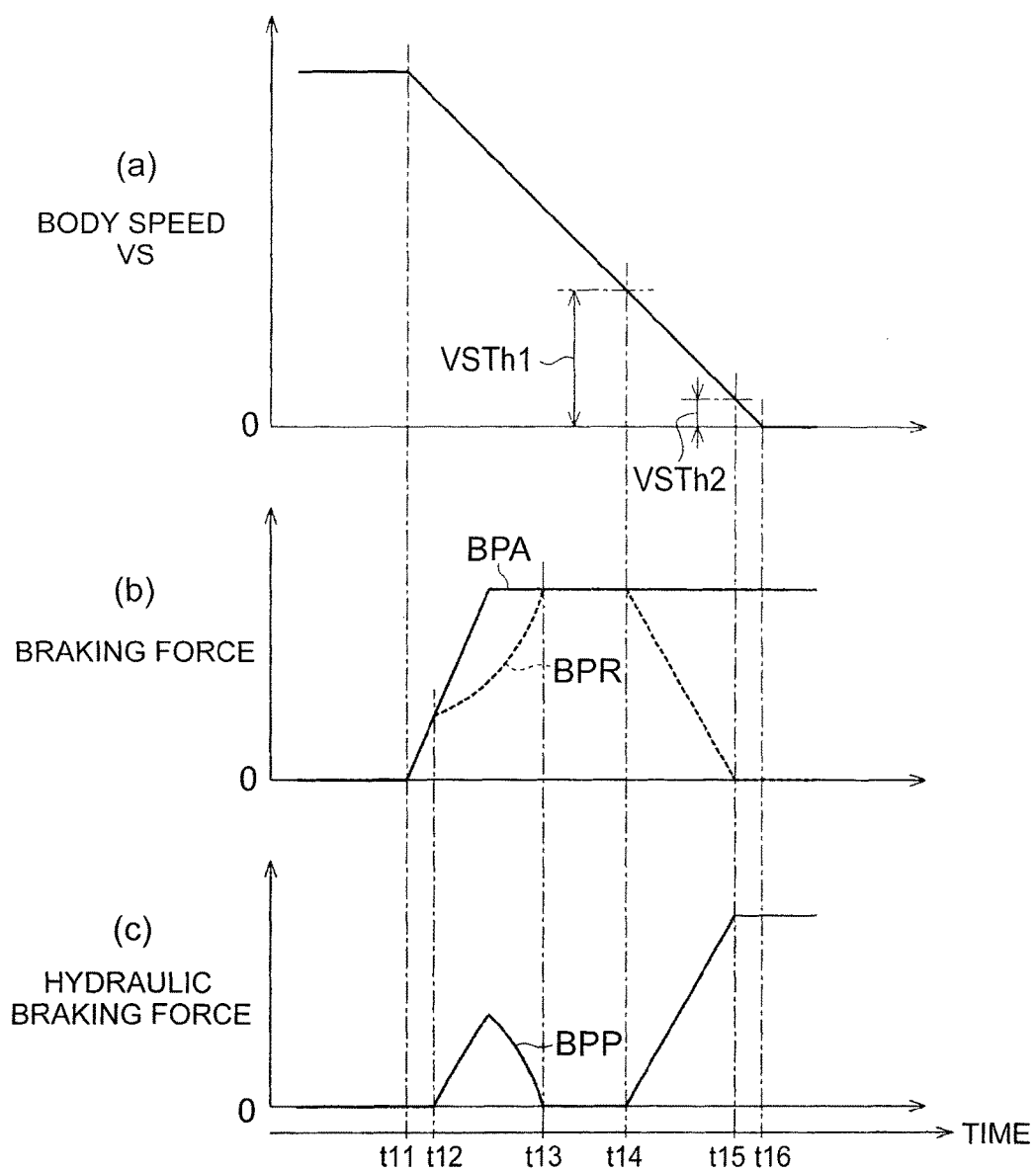
FIG. 3 is a timing chart at the time when brake operation is carried out, in which (a) shows changes in body speed, (b) shows changes in effective braking force and effective regenerative braking force, and (c) shows changes in effective hydraulic braking force.

As shown in (a), (b), (c) of FIG. 3, when brake operation is started at first timing t11, the required braking force BPT gradually increases with an increase in the brake operation amount, and the effective braking force BPA increases with an increase in the required braking force BPT. Because the effective hydraulic braking force BPP is not being imparted to the vehicle in a period from the first timing t11 to second timing t12, the effective braking force BPA is a value equal to the effective regenerative braking force BPR.

From the second timing t12, there arises a deviation between the required braking force BPT and the effective regenerative braking force BPR. Therefore, from the second timing t12, the hydraulic braking system 20 operates so as to bring the effective hydraulic braking force BPP close to a difference obtained by subtracting the effective regenerative braking force BPR from the required braking force BPT. That is, the effective hydraulic braking force BPP according to the WC pressure in each of the wheel cylinders 24a to 24d is imparted to the vehicle. Thus, in a period from the second timing t12 to third timing t13, the effective braking force BPA is equal to the sum of the effective regenerative braking force BPR and the effective hydraulic braking force BPP. At the third timing t13, it is assumed that the effective regenerative braking force BPR has reached the required braking force BPT, and the effective hydraulic braking force BPP is 0 (zero). That is, after the third timing t13, the effective braking force BPA is a value equal to the effective regenerative braking force BPR.

When the effective braking force BPA is being imparted to the vehicle in this way, the body speed VS of the vehicle gradually decreases. At fourth timing t14, the body speed VS becomes a low speed determination value VSTh1, and it may be determined that the body speed VS has become a low speed. Therefore, at the fourth timing t14, substitution control is started. In the substitution control, the effective regenerative braking force BPR is gradually reduced, while the effective hydraulic braking force BPP is gradually increased. As a result, at fifth timing t15 at which the body speed VS reaches a completion determination value VSTh2 that is a substitution completion speed, the effective regenerative braking force BPR is 0 (zero), so substitution control is completed. From the fifth timing t15, the effective hydraulic braking force BPP is equalized to the required braking force BPT.

In connection with the control characteristic of the hydraulic braking system 20, in a period from the second timing t12 to the third timing t13, the effective hydraulic braking force BPP is not always a value equal to a difference obtained by subtracting the effective regenerative braking force BPR from the required braking force BPT. In other words, the effective braking force BPA is a value that slightly deviates from the required braking force BPT.

Incidentally, when the vehicle is decelerated through driver's brake operation, the driver may slightly reduce the deceleration of the vehicle by reducing the brake operation amount. At this time, when the hydraulic braking system 20 is imparting the effective hydraulic braking force BPP to the vehicle, it is desirable to reduce the effective hydraulic braking force BPP in accordance with a reduction in the brake operation amount in a state where the effective regenerative braking force BPR is kept as much as possible, in order to increase regeneration efficiency when the vehicle brakes.

As described above, in the present embodiment, when the effective hydraulic braking force BPP is reduced, a target hydraulic braking force BPPT is computed as a required hydraulic braking force on the basis of the required braking force and the effective regenerative braking force BPR that the second motor 14 is imparting to the vehicle at that timing. Such a computing process is executed, and then the effective hydraulic braking force BPP is reduced with a reduction in the target hydraulic braking force BPPT. Therefore, in comparison with a braking system that does not cooperate a regenerative braking force with a hydraulic braking force, that is, a braking system that imparts only the hydraulic braking force to the vehicle, the response speed of the hydraulic braking force tends to decrease for the necessity of the above-described computing process.

In the by-wire hydraulic braking system 20, when the drain valve 55 of the brake actuator 23 is operated with a reduction in the target hydraulic braking force BPPT, the WC pressure in each of the wheel cylinders 24a to 24d is reduced, with the result that the effective hydraulic braking force BPP is reduced. In this way, unless the brake actuator 23 (specifically, the drain valve 55) is activated, the effective hydraulic braking force BPP is not reduced. Therefore, in comparison with a hydraulic braking system in which the master cylinder 40 communicates with the wheel cylinders 24a to 24d, the response speed of the effective hydraulic braking force BPP tends to decrease.

For these reasons, even when the driver reduces the brake operation amount in order to slightly reduce the deceleration of the vehicle, the deceleration of the vehicle does not decrease soon, and there is a concern that drivability decreases. Such a phenomenon is more remarkable when the brake operation amount is slowly reduced than when the brake operation amount is rapidly reduced.

Figure 4:
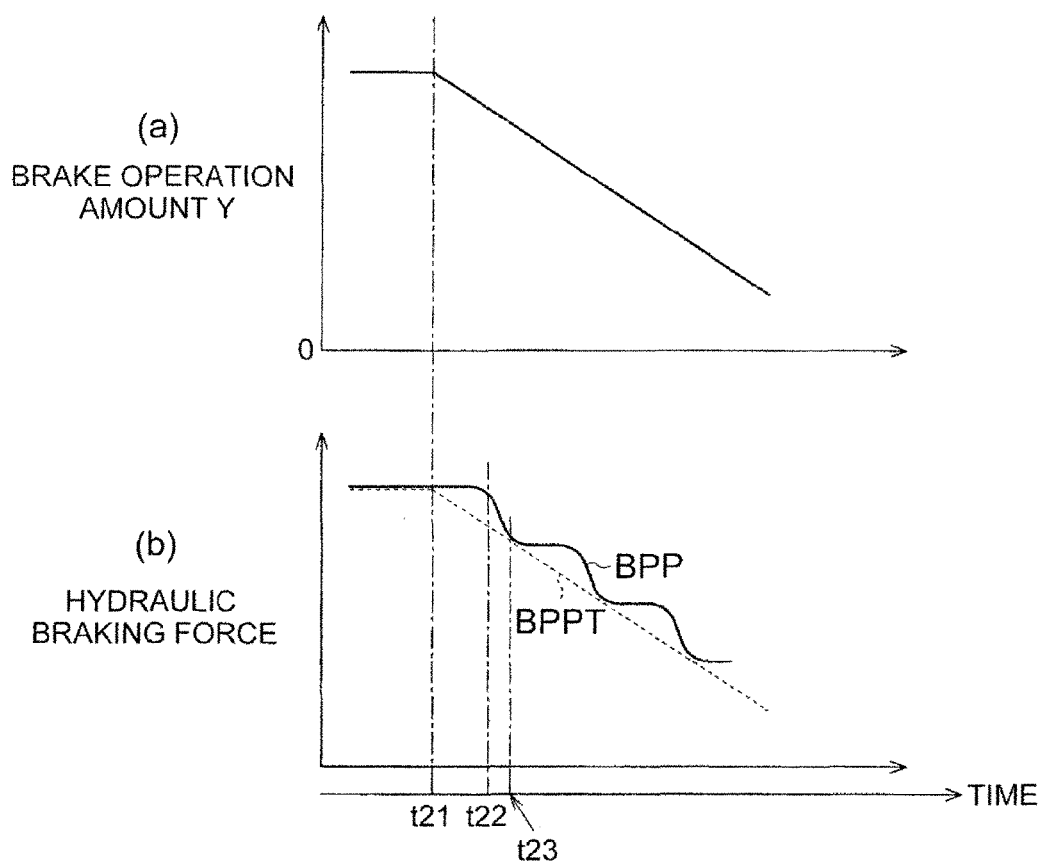
FIG. 4 is a timing chart at the time when the effective hydraulic braking force is reduced in accordance with a reduction in brake operation amount, in which (a) shows changes in brake operation amount, and (b) shows changes in target hydraulic braking force and effective hydraulic braking force.

That is, as shown in (a), (b) of FIG. 4, when a reduction in brake operation amount Y is started at first timing t21, the target hydraulic braking force BPPT is reduced accordingly. As a result, in order to bring the effective hydraulic braking force BPP close to the target hydraulic braking force BPPT, the opening degree of the drain valve 55 of the brake actuator 23 is gradually increased. At this time, a current value that is passed through a solenoid of the drain valve 55 is gradually increased; however, there is a time lag between the timing of the start of supplying current to the drain valve 55 in a closed state and the timing at which the drain valve 55 actually starts opening. Therefore, even when a reduction in the target hydraulic braking force BPPT is started at the first timing t21, a reduction in the effective hydraulic braking force BPP actually starts at second timing t22 that is slightly later than the first timing t21.

Moreover, just after the drain valve 55 has actually opened, a large amount of brake fluid is drained from each of the wheel cylinders 24a to 24d through the drain valve 55. Therefore, the WC pressure in each of the wheel cylinders 24a to 24d is rapidly reduced, and the effective hydraulic braking force BPP is rapidly reduced toward the target hydraulic braking force BPPT. When the effective hydraulic braking force BPP becomes substantially equal to the target hydraulic braking force BPPT at third timing t23, the drain valve 55 is temporarily closed or the opening degree is reduced to a state close to the closed state. As a result, a reduction in the WC pressure is limited, and a reduction in the effective hydraulic braking force BPP is limited.

When the target hydraulic braking force BPPT is reduced from the third timing t23 as well, the mode of reduction in the effective hydraulic braking force BPP like the mode of reduction from the first timing t21 to the third timing t23 is repeated.

Therefore, in the present embodiment, when the effective hydraulic braking force BPP is reduced with a reduction in the brake operation amount, in an initial stage of the start of reduction in the target hydraulic braking force BPPT for controlling the effective hydraulic braking force BPP, the second motor 14 is controlled so as to execute a difference correction process (correction process) for compensating for a delay in response of the effective hydraulic braking force BPP. The response speed of the effective regenerative braking force BPR or driving force that is imparted to the vehicle by the second motor 14 is higher than the response speed of the effective hydraulic braking force BPP that is imparted to the vehicle by the hydraulic braking system 20. Therefore, by appropriately operating the second motor 14, it is possible to appropriately compensate for a delay in response of the effective hydraulic braking force BPP.

Specifically, when the effective regenerative braking force BPR is being imparted to the vehicle, the effective regenerative braking force BPR is temporarily reduced by executing the difference correction process. Thus, the effective braking force BPA that is the sum of the effective hydraulic braking force BPP and the effective regenerative braking force BPR is reduced, and it is possible to early reduce the deceleration of the vehicle with a reduction in the brake operation amount. On the other hand, when the effective regenerative braking force BPR is not being imparted to the vehicle, the driving force that is imparted to the vehicle by the second motor 14 is temporarily increased by executing the difference correction process. Thus, the difference between the effective braking force BPA and the driving force decreases. Therefore, even when the effective braking force BPA does not decrease soon, it is possible to early reduce the deceleration of the vehicle with a reduction in the brake operation amount.

Next, a process routine that is executed by the brake control unit 104 during driver's brake operation will be described with reference to the flowcharts shown in FIG. 5 and FIG. 6 and the table shown in FIG. 7. The process routine is executed at intervals of a preset control cycle during driver's brake operation.

As shown in FIG. 5, in the process routine, the brake control unit 104 computes the required braking force BPT on the basis of the brake operation amount detected by the brake operation amount detection sensor SE2 (step S11). Subsequently, the brake control unit 104 computes the required regenerative braking force BPRT on the basis of a last value of the required regenerative braking force, the body speed at that timing, and the like (step S12). The last value of the required regenerative braking force is the required regenerative braking force BPRT computed in the last control cycle. The required braking force computed in the last control cycle is defined as last required braking force BPT(n−1), and the required braking force computed in the current control cycle is defined as current required braking force BPT(n). In this case, when the last required braking force BPT(n−1) is larger than the current required braking force BPT(n) and the last value of the required regenerative braking force is smaller than the current required braking force BPT(n), the required regenerative braking force BPRT is set to a value equal to the last value of the required regenerative braking force.

The brake control unit 104 acquires the effective regenerative braking force BPR from the power management computer 101 (step S13). The effective regenerative braking force BPR is the regenerative braking force that the second motor 14 is imparting to the vehicle at present timing. Subsequently, the brake control unit 104 sets the target hydraulic braking force BPPT to a difference (=BPT−BPR) obtained by subtracting the effective regenerative braking force BPR acquired in step S13 from the required braking force BPT computed in step S11 (step S14). That is, the target hydraulic braking force BPPT is increased as the difference between the required braking force BPT and the effective regenerative braking force BPR increases. Thus, in this point, the brake control unit 104 constitutes an example of a hydraulic pressure required value computing unit.

The brake control unit 104 controls the hydraulic braking system 20 so as to bring the effective hydraulic braking force BPP close to the computed target hydraulic braking force BPPT (step S15). Subsequently, the brake control unit 104 executes a compensation process (described later) with the use of the flowchart of FIG. 6 (step S16). The compensation process is a process for compensating for a delay in response of the effective hydraulic braking force BPP, resulting from a reduction in the target hydraulic braking force BPPT. The brake control unit 104 transmits information about the required regenerative braking force BPRT to the power management computer 101 (step S17), and once ends the process routine.

The power management computer 101 that has received the information about the required regenerative braking force BPRT transmits the information to the motor control unit 103. The motor control unit 103 controls the second motor 14 on the basis of a smaller one of the required braking force BPT indicated by the received information and the maximum value of the regenerative braking force that is allowed to be imparted at that timing.

Next, a compensation process routine of step S16 will be described with reference to FIG. 6. As shown in FIG. 6, in the process routine, the brake control unit 104 determines whether the brake pedal 21 is being returned from a depressed state (step S21). For example, when the brake operation amount detected by the brake operation amount detection sensor SE2 is decreasing, it may be determined that the brake pedal 21 is being returned from a depressed state. When the brake pedal 21 is not being returned from a depressed state (NO in step S21), the brake control unit 104 ends the process routine.

On the other hand, when the brake pedal 21 is being returned from a depressed state (YES in step S21), the brake control unit 104 computes the effective hydraulic braking force BPP that is being imparted to the vehicle by the hydraulic braking system 20 (step S22). For example, the brake control unit 104 is allowed to compute the effective hydraulic braking force BPP so as to increase the effective hydraulic braking force BPP as the WC pressure that is detected by the WC pressure detection sensor SE4 increases. Subsequently, the brake control unit 104 sets a correction target difference ΔBPP to a difference (=BPP−BPPT) obtained by subtracting the target hydraulic braking force BPPT computed in step S14 from the effective hydraulic braking force BPP computed in step S22 (step S23).

The brake control unit 104 determines whether the effective regenerative braking force BPR that is being imparted to the vehicle by the second motor 14 is 0 (zero) (step S24). That is, when the effective regenerative braking force BPR is 0 (zero), it may be determined that the regenerative braking force is not being imparted to the vehicle; whereas, when the effective regenerative braking force BPR is not 0 (zero), it may be determined that the regenerative braking force is being imparted to the vehicle.

When the effective regenerative braking force BPR is not 0 (zero) (NO in step S24), the brake control unit 104 multiplies the correction target difference ΔBPP computed in step S23 by a predetermined gain Gb, and sets the product (=ΔBPP×Gb) for a braking correction value X (step S25). The gain Gb is a value (for example, 0.7) that is larger than 0 (zero) and smaller than 1. The brake control unit 104 sets 0 (zero) for an output limit MD_Lim that is a limit value of the amount of increase at the time of increasing the driving force that is output from the second motor 14 (step S26), and proceeds with the process to step S31 (described later).

On the other hand, when the effective regenerative braking force BPR is 0 (zero) in step S24 (YES), the brake control unit 104 multiplies the effective hydraulic braking force BPP computed in step S22 by a predetermined gain Ga, and sets the product (=BPP×Ga) for the output limit MD_Lim (step S27). The gain Ga may be a value equal to the gain Gb or may be a value different from the gain Gb as long as the gain Ga is a value (for example, 0.7) that is larger than 0 (zero) and smaller than 1.

As described above, when the regenerative braking force is not being imparted to the vehicle, a delay in response of the effective hydraulic braking force BPP is compensated by increasing the driving force that the second motor 14 imparts to the vehicle. In this way, when the driving force from the second motor 14 is increased, if the amount of increase is too large, there is a concern that the vehicle exhibits an acceleration tendency even when the accelerator pedal 18 is not operated and the brake pedal 21 is operated. Therefore, at the time of compensating for a delay in response of the effective hydraulic braking force BPP by increasing the driving force from the second motor 14, the output limit MD_Lim is set as a limit value of the amount of increase in the driving force so that the vehicle does not exhibit an acceleration tendency.

The output limit MD_Lim is a value for not causing the vehicle to accelerate. Therefore, the output limit MD_Lim may be relatively increased when the effective hydraulic braking force BPP that is being imparted to the vehicle is large; however, the output limit MD_Lim is desirably reduced when the effective hydraulic braking force BPP is small. Therefore, in the present embodiment, the computed result obtained by multiplying the effective hydraulic braking force BPP by the gain Ga is set for the output limit MD_Lim. Thus, the output limit MD_Lim is reduced as the effective hydraulic braking force BPP decreases.

The brake control unit 104 multiplies the correction target difference ΔBPP computed in step S23 by a predetermined gain Gc, and sets the product (=ΔBPP×Gc) for a driving correction value Z (step S28). The gain Gc is a value (for example, 0.7) that is larger than 0 (zero) and smaller than 1. Thus, the driving correction value Z is increased as the correction target difference ΔBPP increases.

Subsequently, the brake control unit 104 determines whether the front wheels FR, FL that are drive wheels to which the driving force is imparted from the second motor 14 exhibit an acceleration tendency (step S29). For example, the brake control unit 104 may obtain a wheel acceleration of each of the front wheels FR, FL by calculating a temporal differentiation of the wheel speed of each of the front wheels FR, FL, and may determine that the front wheels FR, FL exhibit an acceleration tendency when the wheel acceleration is larger than or equal to 0 (zero). When the front wheels FR, FL exhibit an acceleration tendency (YES in step S29), the brake control unit 104 proceeds to step S26, sets the output limit MD_Lim to 0 (zero), and then proceeds with the process to step S31 (described later).

On the other hand, when the front wheels FR, FL do not exhibit an acceleration tendency (NO in step S29), the brake control unit 104 sets the braking correction value X to 0 (zero) (step S30), and proceeds with the process to the next step S31.

In step S31, the brake control unit 104 determines whether a completion condition for completing a correction according to the correction target difference ΔBPP is satisfied. This completion condition will be described later. When the completion condition is satisfied (YES in step S31), the brake control unit 104 ends the process routine without executing the processes of step S32 to step S34. On the other hand, when the completion condition is not satisfied (NO in step S31), the brake control unit 104 subtracts the braking correction value X computed in step S25 or step S30 from the required regenerative braking force BPRT computed in step S12, and sets the difference (=BPRT−X) for the required regenerative braking force BPRT (step S32). That is, when the braking correction value X is larger than 0 (zero), the required regenerative braking force BPRT is corrected to reduce in step S32.

Subsequently, the brake control unit 104 sets a required driving force MDT to a smaller one of the computed output limit MD_Lim and the driving correction value Z (step S33). That is, the required driving force MDT is increased within the range not in excess of the output limit MD_Lim as the correction target difference ΔBPP increases. The brake control unit 104 transmits information about the determined required driving force MDT to the power management computer 101 (step S34). After that, the brake control unit 104 ends the process routine.

As a result, the power management computer 101 that has received the information transmits the information to the motor control unit 103. The motor control unit 103 controls the second motor 14 on the basis of the received information so that the driving force that is imparted to the vehicle is increased by the amount of the required driving force MDT.

That is, in the present embodiment, when the target hydraulic braking force BPPT is reduced on the basis of a reduction in the brake operation amount, the difference correction process for reducing the effective regenerative braking force BPR that the second motor 14 imparts to the vehicle or increasing the driving force that the second motor 14 imparts to the vehicle is executed. Thus, in this point, the brake control unit 104 and the motor control unit 103 constitute an example of a correction control unit.

Next, the completion condition of step S31 will be described with reference to FIG. 7. As shown in FIG. 7, the completion condition of the difference correction process includes any one of the following five conditions (Condition 1 to Condition 5).

(Condition 1) The correction target difference ΔBPP becomes smaller than a determination value ΔBPPTh. In this case, the determination value ΔBPPTh is preset to a value at which it may be determined that there is almost no deviation between the target hydraulic braking force BPPT and the effective hydraulic braking force BPP. That is, after a transition from a state where the correction target difference ΔBPP is larger than or equal to the determination value ΔBPPTh to a state where the correction target difference ΔBPP is smaller than the determination value ΔBPPTh, it may be determined that the effective hydraulic braking force BPP is reduced in accordance with a reduction in the brake operation amount. Therefore, in response to such a transition in state, the difference correction process may be completed.

Even when the target hydraulic braking force BPPT is reduced in accordance with a reduction in the brake operation amount, there is a case where the correction target difference ΔBPP is not larger than or equal to the determination value ΔBPPTh. Therefore, when Condition 1 is employed as the completion condition, there is a case where the difference correction process is not executed.

(Condition 2) The maximum value of the correction target difference (correction target difference maximum value) ΔBPP_max during execution of the difference correction process is multiplied by a predetermined gain Gd, the product (=ΔBPP_max×Gd) is set for the determination value ΔBPPTh, and the correction target difference ΔBPP becomes smaller than the determination value ΔBPPTh. The gain Gd is a value (for example, 0.3) that is larger than 0 (zero) and smaller than 1.

That is, the correction target difference ΔBPP is monitored during execution of the difference correction process, and the maximum value ΔBPP_max of the correction target difference. ΔBPP is acquired. After the maximum value ΔBPP_max is acquired, when the correction target difference ΔBPP becomes smaller than the determination value ΔBPPTh based on the maximum value ΔBPP_max, it may be determined that the effective hydraulic braking force BPP is reduced in accordance with a reduction in the brake operation amount. Therefore, in response to such a transition in state, the difference correction process may be completed. In this case, when the target hydraulic braking force BPPT is reduced in accordance with a reduction in the brake operation amount, the difference correction process is definitely executed.

(Condition 3) The deceleration DVS of the vehicle has decreased. The fact that the deceleration DVS of the vehicle has decreased means that an actual behavior of the vehicle is close to a vehicle behavior that is required by the driver who has reduced the brake operation amount. Therefore, when the fact that the deceleration DVS of the vehicle decreases has been detected, the difference correction process may be completed.

(Condition 4) A reduction in the WC pressure Pwc in each of the wheel cylinders 24a to 24d has been detected. There is a correlation between the magnitude of the effective hydraulic braking force BPP and the WC pressure Pwc. Therefore, when the WC pressure Pwc is reduced, it may be determined that a reduction in the effective hydraulic braking force BPP is started. In this way, when the effective hydraulic braking force BPP starts to be reduced, it is possible to reduce the deceleration DVS of the vehicle even when the difference correction process is not executed. Therefore, in response to the start of a reduction in the WC pressure Pwc, the difference correction process may be completed.

(Condition 5) An elapsed time T from the timing of the start of returning the brake pedal 21 from a depressed state exceeds a prescribed time TTh, that is, a correction period elapses. Although the response speed of the effective hydraulic braking force BPP is low, when a certain period elapses from the start of a reduction in the brake operation amount, the rate of reduction in the effective hydraulic braking force BPP increases with a reduction in the target hydraulic braking force BPPT. In this way, when the rate of reduction in the effective hydraulic braking force BPP increases, it is possible to reduce the deceleration DVS of the vehicle even when the difference correction process is not executed. Thus, by presetting the prescribed time TTh as a determination criterion as to whether the deceleration DVS of the vehicle has started decreasing, it is possible to complete the difference correction process in response to the fact that the deceleration DVS of the vehicle has started decreasing.

Figure 8:
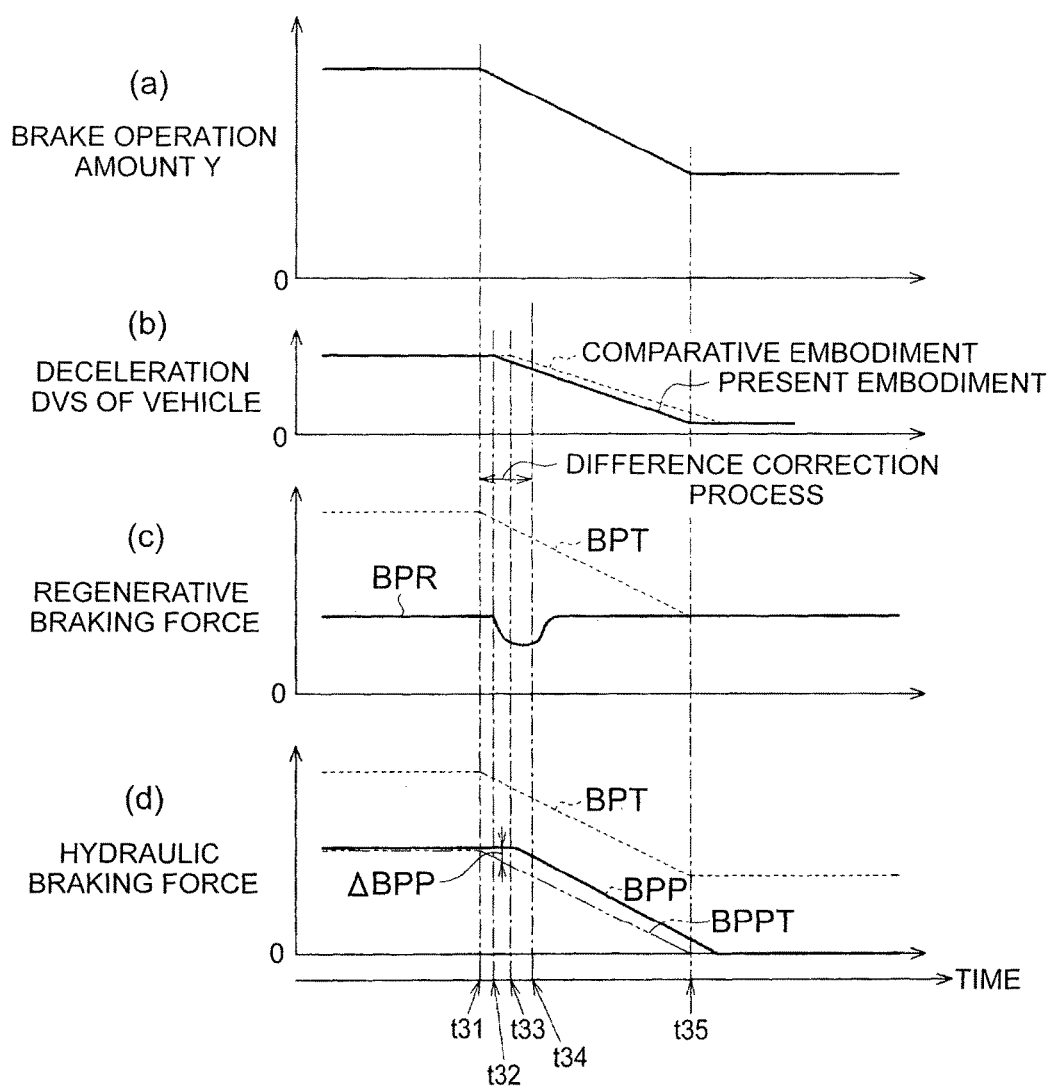
FIG. 8 is a timing chart at the time when the effective hydraulic braking force is reduced in accordance with a reduction in brake operation amount in a situation that the effective regenerative braking force is being imparted to the vehicle, in which (a) shows changes in brake operation amount, (b) shows changes in the deceleration of the vehicle, (c) shows changes in effective regenerative braking force, and (d) shows changes in effective hydraulic braking force and target hydraulic braking force.

Next, the operation of the vehicle at the time of reducing the effective hydraulic braking force BPP in accordance with a reduction in the brake operation amount will be described with reference to the timing charts shown in FIG. 8 and FIG. 9. FIG. 8 shows the timing chart in the case where the effective regenerative braking force BPR is being imparted to the vehicle. FIG. 9 shows the timing chart in the case where the effective regenerative braking force BPR is not being imparted to the vehicle.

Initially, the operation will be described with reference to the timing chart shown in FIG. 8. As shown in (a), (b), (c), (d) of FIG. 8, when the brake operation amount Y starts to be reduced at first timing t31, the required braking force BPT also starts to be reduced accordingly (YES in step S21). Although the effective regenerative braking force BPR is being imparted to the vehicle by the second motor 14 at the first timing t3.1 (NO in step S24), the effective regenerative braking force BPR is smaller than the required braking force BPT. Therefore, with a reduction in the required braking force BPT, the target hydraulic braking force BPPT is reduced.

Even when the target hydraulic braking force BPPT is reduced, the correction target difference ΔBPP that is the difference obtained by subtracting the target hydraulic braking force BPPT from the effective hydraulic braking force BPP gradually increases with a delay in response of the effective hydraulic braking force BPP. Therefore, the braking correction value X gradually increases with an increase in the correction target difference ΔBPP through execution of the difference correction process (step S25). As a result, the required regenerative braking force BPRT is corrected to reduce from the first timing t31 (step S32).

As a result of a reduction in the required regenerative braking force BPRT through execution of the difference correction process, the effective regenerative braking force BPR is reduced from second timing t32. Moreover, at this time, as the correction target difference ΔBPP increases, the effective regenerative braking force BPR is reduced by a larger amount. Therefore, even when a reduction in the effective hydraulic braking force BPP is not started soon, the effective braking force BPA (=BPR+BPP) that is an actual braking force of the vehicle as a whole is early reduced as compared to the case where the difference correction process is not executed. Thus, the deceleration DVS of the vehicle starts decreasing at the second timing t32 that is the timing earlier than the third timing t33 at which a reduction of the effective hydraulic braking force BPP is started and that is the timing at which a reduction in the effective braking force BPA (in this case, the effective regenerative braking force BPR) is started.

In the case of a comparative embodiment in which the difference correction process is not executed, because the effective regenerative braking force BPR is held, the effective braking force BPA starts to be reduced after the effective hydraulic braking force BPP is actually reduced. Therefore, as indicated by the dashed line in (b) of FIG. 8, the deceleration DVS of the vehicle starts decreasing from the third timing t33 at which a reduction in the effective hydraulic braking force BPP is actually started. In contrast, in the present embodiment, because the effective regenerative braking force BPR having a higher response speed than the effective hydraulic braking force BPP is reduced through execution of the difference correction process, a decrease in the deceleration DVS of the vehicle is started from the second timing t32 that is earlier than the third timing t33.

When the completion condition is satisfied at fourth timing t34 that is later than the third timing t33 at which the effective hydraulic braking force BPP starts to be reduced (YES in step S31), the difference correction process is completed. As a result, correction for a reduction in the required regenerative braking force BPRT is completed, and the effective regenerative braking force BPR gradually increases and is returned to the level before the first timing t31. In this way, even when the effective regenerative braking force BPR returns to the original level, because the effective hydraulic braking force BPP has decreased in accordance with a reduction in the target hydraulic braking force BPPT, the deceleration DVS of the vehicle decreases with a reduction in the brake operation amount Y.

After that, when the brake operation amount Y is held at fifth timing t35, the target hydraulic braking force BPPT is also held. When the effective hydraulic braking force BPP becomes substantially, equal to the target hydraulic braking force BPPT, the effective hydraulic braking force BPP is held at a value according to the target hydraulic braking force BPPT.

Next, the operation will be described with reference to the timing chart shown in FIG. 9. The time when the vehicle brakes in a state where the effective regenerative braking force BPR is not being imparted to the vehicle may be a period from completion of the above-described substitution control to a stop of the vehicle (that is, a period from the fifth timing t15 to sixth timing t16 in FIG. 3).

As shown in (a), (b), (c), (d), (e) of FIG. 9, when the brake operation amount Y starts to be reduced at first timing t41, the required braking force BPT also starts to be reduced accordingly (YES in step S21). At the first timing t41, the effective hydraulic braking force BPP is being imparted to the vehicle by the hydraulic braking system 20, while the effective regenerative braking force BPR is not being imparted to the vehicle (YES in step S24). Therefore, a reduction in the target hydraulic braking force BPPT is also started from the first timing t41.

After completion of the substitution control, a process for causing the hybrid vehicle to slowly move forward (hereinafter, also referred to as pseudo-creep process) as in the case of a creep phenomenon may be executed. That is, during stop of the engine, the driving force MD is being slightly imparted from the second motor 14 to the front wheels FR, FL even in a state where the accelerator pedal 18 is not operated. Thus, when the brake operation amount Y becomes 0 (zero) in a state where the pseudo-creep process is executed, it is possible to cause the vehicle to travel at an extremely low speed.

Even when the target hydraulic braking force BPPT is reduced in accordance with a reduction in the brake operation amount Y, the correction target difference ΔBPP that is the difference obtained by subtracting the target hydraulic braking force BPPT from the effective hydraulic braking force BPP gradually increases because of a delay in response of the effective hydraulic braking force BPP. Therefore, the driving correction value Z gradually increases with an increase in the correction target difference ΔBPP (step S28). That is, from the first timing t41, the required driving force MDT that is a required value of the second motor 14 gradually increases within the range not in excess of the output limit MD_Lim (step S33). As a result, from the second timing t42 thereafter, the driving force MD that is output from the second motor 14 is gradually increased. That is, the driving force MD is increased by an amount appropriate to the required driving force MDT.

Thus, a difference between the effective braking force BPA that is the braking force of the vehicle as a whole (in this case, the effective hydraulic braking force BPP) and the driving force MD that is being imparted to the vehicle gradually decreases. As a result, even before a reduction in the effective braking force BPA is started, the deceleration DVS of the vehicle starts decreasing from second timing t42 just after the start of an increase in the driving force MD that is output from the second motor 14.

The effective hydraulic braking force BPP starts to be reduced from third timing t43 that is later than the second timing t42. Therefore, in the case of the comparative embodiment in which the difference correction process is not executed, as indicated by the dashed line in (c) of FIG. 9, the deceleration DVS of the vehicle starts decreasing from the third timing t43. In contrast, in the present embodiment, because the driving force MD is increased through the execution of the difference correction process, the deceleration DVS of the vehicle starts decreasing from the second timing t42 that is earlier than the third timing t43.

When the completion condition is satisfied at the third timing t43 (YES in step S31), the difference correction process is completed. As a result, the driving force MD gradually decreases, and is returned to the level before the first timing t41. In this way, even when the driving force MD has decreased, the effective hydraulic braking force BPP has decreased in accordance with a reduction in the target hydraulic braking force BPPT, so the deceleration DVS of the vehicle decreases with a reduction in the brake operation amount Y.

At fourth timing t44 thereafter, the body speed VS of the vehicle becomes 0 (zero), and the vehicle stops. In the case of the present embodiment, as compared to the case of the above-described comparative embodiment, the deceleration DVS just before a stop of the vehicle is small because of an early start of a decrease in the deceleration DVS of the vehicle. Therefore, it is possible to suppress pitching of the vehicle body, which occurs at the time when the vehicle stops.

According to the above-described configuration and operation, the following advantageous effects are obtained.

(1) When the effective hydraulic braking force BPP is reduced in accordance with a reduction in the brake operation amount Y, the difference correction process is executed. At this time, when the effective regenerative braking force BPR is being imparted to the vehicle, the effective regenerative braking force BPR is corrected to reduce, with the result that it is possible to reduce the effective braking force BPA even in a period in which the effective hydraulic braking force BPP is not reduced soon. That is, it is possible to bring the mode of reduction in the effective braking force BPA close to the mode of reduction in the required braking force BPT according to the brake operation amount Y. Thus, in reducing the effective hydraulic braking force BPP in accordance with a reduction in the brake operation amount Y, it is possible to early reduce the deceleration DVS of the vehicle, so it is possible to improve drivability.

(2) When the effective regenerative braking force BPR is corrected to reduce through the execution of the difference correction process, as the correction target difference ΔBPP increases, the braking correction value X increases, and the effective regenerative braking force BPR is reduced, by a larger amount. Therefore, in comparison with the case where the braking correction value X is a fixed value, it is possible to bring the mode of reduction in the effective braking force BPA that is the sum of the effective regenerative braking force BPR and the effective hydraulic braking force BPP close to the mode of reduction in the required braking force BPT according to the brake operation amount Y. Thus, it is possible to early bring the deceleration DVS of the vehicle close to the deceleration that is required by the driver.

(3) In reducing the effective hydraulic braking force BPP in accordance with a reduction in the brake operation amount Y, when the effective regenerative braking force BPR is not being imparted to the vehicle, the driving force MD from the second motor 14 is corrected to increase through the execution of the difference correction process. In this way, by correcting to increase the driving force MD, it is possible to reduce the deceleration DVS of the vehicle even in a period in which the effective hydraulic braking force BPP is not reduced soon and the effective braking force BPA is not reduced soon. That is, it is possible to reduce the deceleration DVS of the vehicle earlier than that in the case of the comparative embodiment in which the difference correction process is not executed. Thus, even when the brake operation amount Y is reduced at the time when the effective regenerative braking force BPR is not being imparted to the vehicle, it is possible to improve drivability.

(4) In correcting to increase the driving force MD through the execution of the difference correction process, as the correction target difference ΔBPP increases, the driving correction value Z increases, and the driving force MD is increased by a larger amount. Therefore, in comparison with the case where the driving correction value Z is set to a fixed value, it is possible to bring the mode of reduction in the deceleration DVS of the vehicle close to the mode of reduction in deceleration, which is required by the driver. Thus, it is possible to improve drivability.

(5) Even when the driving force MD is increased through the execution of the difference correction process, an increase in the driving force MD is limited so that the deceleration tendency of the vehicle is kept. As a result, an excessive increase in the driving force MD through, the execution of the difference correction process is avoided. Thus, it is possible to suppress occurrence of a deviation between an actual behavior of the vehicle and a behavior that is required by the driver.

In the present embodiment, the output limit MD_Lim is reduced as the effective hydraulic braking force BPP at that timing decreases. Thus, when the effective hydraulic braking force BPP is small, the driving force MD is difficult to increase. As a result, an excessive increase in the driving force MD through the execution of the difference correction process is avoided, so it is possible to suppress occurrence of a deviation between an actual behavior of the vehicle and a behavior that is required by the driver.

(6) Even when the output limit MD_Lim is set as described above, but when the wheel speed of each of the front wheels FR, FL that are drive wheels exhibits an acceleration tendency, the vehicle accelerates in the end. Therefore, when the wheel speed of each of the front wheels FR, FL begins to exhibit an acceleration tendency while the driving force MD is corrected to increase through the execution of the difference correction process, the difference correction process is completed. Thus, it is possible to suppress occurrence of a deviation between an actual behavior of the vehicle and a behavior that is required by the driver.

(7) A method of early reducing the effective hydraulic braking force BPP in accordance with a reduction in the brake operation amount Y is conceivably a method of, in response to the start of reduction in the brake operation amount Y, reducing the target hydraulic braking force BPPT by an amount larger than or equal to the amount of reduction according to an actual brake operation amount Y and then reducing the effective hydraulic braking force BPP on the basis of the reduced target hydraulic braking force BPPT. With this method, in comparison with the case where the target hydraulic braking force BPPT is not corrected to reduce, it is possible to early start reducing the effective hydraulic braking force BPP, so it is possible to early reduce the deceleration. DVS of the vehicle.

In contrast, in the present embodiment, by correcting the effective regenerative braking force BPR or the driving force MD, which has a higher response speed than the effective hydraulic braking force BPP, the deceleration DVS of the vehicle is early reduced. As a result, in comparison with the case where the target hydraulic braking force BPPT is corrected to reduce as described above, it is possible to more quickly reduce the deceleration DVS of the vehicle, so it is possible to further improve drivability.

(8) Even during the execution of the difference correction process, but when the predetermined completion condition is satisfied, the difference correction process is completed. As a result, even when the difference correction process is not executed, continuation of the execution of the difference correction process is suppressed after the effective hydraulic braking force BPP is reduced with a reduction in the brake operation amount Y. Particularly, when the driving force MD is corrected to increase through the execution of the difference correction process, it is possible to reduce electric power that is supplied to the second motor 14 through the completion of the difference correction process. In this way, by reducing electric power that is supplied to the second motor 14, it is possible to reduce the load of the second motor 14. It is also possible to reduce an electric power consumption while the vehicle is braking.

When the effective regenerative braking force BPR is reduced through the execution of the difference correction process, it is possible to improve drivability in preference to the recovery efficiency of energy (electric power). Therefore, in this way, in response to fulfillment of the completion condition in a state where the effective regenerative braking force BPR is being reduced, the effective regenerative braking force BPR is increased by completing the difference correction process. As a result, it is possible to suppress a decrease in the recovery efficiency of energy (electric power) during driver's brake operation.

The above-described embodiment may be modified into the following alternative embodiments.

The completion condition may include two or more conditions (for example, Condition 1 and Condition 5) as long as the completion condition includes at least one of Condition 1 to Condition 5. For example, when the completion condition includes Condition 1 and Condition 5, the difference correction process may be completed in response to the fact that any one of Condition 1 and Condition 5 is satisfied or the difference correction process may be completed in response to the fact that both Condition 1 and Condition 5 are satisfied.

When the difference correction process is completed in response to detection of an acceleration tendency of the vehicle in a state where the driving force MD is corrected to increase through the execution of the difference correction process, the output limit MD_Lim does not need to be provided. In this case as well, it is possible to complete the difference correction process before the driving force MD is excessively increased through the execution of the difference correction process.

When a road surface on which the vehicle is traveling is a downhill, the driving force MD that is required to move the vehicle forward may be smaller than that when the road surface is a horizontal road. When the road surface on which the vehicle is traveling is an uphill, the driving force MD that is required to move the vehicle forward needs to be larger than that when the road surface is a horizontal road. Therefore, the output limit MD_Lim may be corrected to reduce when the road surface is a downhill, and may be corrected to increase when the road surface is an uphill.

In the above-described embodiment, when the difference correction process is executed in a state where the effective regenerative braking force BPR is not being imparted to the vehicle, the driving correction value Z is determined to a value according to the correction target difference ΔBPP. Instead, the driving correction value Z may be fixed to a predetermined value set in advance irrespective of the magnitude of the correction target difference ΔBPP. In this case as well, an advantageous effect equivalent to the above (3) is obtained.

In the above-described embodiment, when the difference correction process is executed in a state where the effective regenerative braking force BPR is being imparted to the vehicle, the braking correction value X is determined to a value according to the correction target difference ΔBPP. Instead, the braking correction value X may be fixed to a predetermined value set in advance irrespective of the magnitude of the correction target difference ΔBPP. In this case as well, an advantageous effect equivalent to the above (1) is obtained.

The drive regeneration imparting device provided in the vehicle may include an actuator that imparts the driving force MD (hereinafter, also referred to as driving device) and an actuator that imparts the effective regenerative braking force BPR (hereinafter, also referred to as regeneration device). In this case, when the difference correction process is executed in a state where the regeneration device is imparting the effective regenerative braking force BPR to the vehicle, the driving force MD that the driving device is imparting to the vehicle may be corrected to increase. With this configuration as well, an advantageous effect equivalent to the above (3) is obtained.

The drive regeneration imparting device may be controlled so as to increase the driving force MD while reducing the effective regenerative braking force BPR. With this configuration as well, advantageous effects equivalent to the above (1), (3) are obtained.

The wheels that the second motor 14 imparts a driving force may be not the front wheels FR, FL but the rear wheels RR, RL or may be all the wheels FR, FL, RR, RL. The vehicle may be a one-motor hybrid vehicle other than the two-motor hybrid vehicle as long as the vehicle includes the engine 11. When a generator is provided as a regenerative braking system, the vehicle may include only the engine 11 as a driving source.

The vehicle may be a vehicle that does not include the engine 11. For example, the vehicle may be an electric vehicle. The brake operation member may be any brake operation member (for example, a brake lever) other than the brake pedal 21 as long as the brake operation member is operated by the driver.

What is claimed is:

1. A braking control apparatus for a vehicle, the vehicle including a drive regeneration imparting device and a hydraulic braking system, the drive regeneration imparting device being configured to impart a driving force or a regenerative braking force to the vehicle, the hydraulic braking system being configured to impart a hydraulic braking force to the vehicle by adjusting a hydraulic pressure in a wheel cylinder provided in a wheel, the braking control apparatus comprising:
an electronic control unit configured to, when the hydraulic braking force is reduced based on a reduction in brake operation amount that is an operation amount of a brake operation member, execute a correction process, the correction process being a process of reducing the regenerative braking force that is being imparted to the vehicle by the drive regeneration imparting device.

2. The braking control apparatus according to claim 1, wherein
the electronic control unit is configured to increase a required hydraulic braking force as a difference between a required braking force and the regenerative braking force increases, the required braking force is a braking force according to the brake operation amount, the regenerative braking force is a braking force that is being imparted to the vehicle by the drive regeneration imparting device,
the electronic control unit is configured to, when the hydraulic braking force is reduced based on a reduction in the brake operation amount, reduce the regenerative braking force, which is being imparted to the vehicle by the drive regeneration imparting device, through execution of the correction process as a correction target difference increases, and
the correction target difference is a difference between the computed required hydraulic braking force and the hydraulic braking force that is being imparted to the vehicle by the hydraulic braking system.

3. The braking control apparatus according to claim 2, wherein
the electronic control unit is configured to, when the hydraulic braking force is reduced in accordance with a reduction in the brake operation amount in a situation that the regenerative braking force is not being imparted to the vehicle by the drive regeneration imparting device, execute, as the correction process, a process of increasing the driving force that the drive regeneration imparting device imparts to the vehicle as the correction target difference increases.

4. The braking control apparatus according to claim 1, wherein
the electronic control unit is configured to, when the hydraulic braking force is reduced in accordance with a reduction in the brake operation amount in a situation that the regenerative braking force is not being imparted to the vehicle by the drive regeneration imparting device, execute, as the correction process, a process of increasing the driving force that the drive regeneration imparting device imparts to the vehicle.

5. The braking control apparatus according to claim 4, wherein
the electronic control unit is configured to, when the driving force that the drive regeneration imparting device imparts to the vehicle is being increased through execution of the correction process, limit an increase in the driving force such that a deceleration tendency of the vehicle is kept.

6. The braking control apparatus according to claim 4, wherein
the electronic control unit is configured to, when the driving force that the drive regeneration imparting device imparts to the vehicle is being increased through execution of the correction process, reduce a limit value of an amount of increase in the driving force as the hydraulic braking force, which is being imparted to the vehicle by the hydraulic braking system, decreases.

7. The braking control apparatus according to claim 4, wherein
the electronic control unit is configured to, when the driving force that the drive regeneration imparting device imparts to the vehicle through execution of the correction process is being increased, complete execution of the correction process on the condition that a wheel speed of a drive wheel to which the driving force is being imparted by the drive regeneration imparting device exhibits an acceleration tendency.

8. The braking control apparatus according to claim 4, wherein
the electronic control unit is configured to, when a predetermined completion condition is satisfied in a state where the driving force that the drive regeneration imparting device imparts to the vehicle through execution of the correction process is being increased, complete execution of the correction process.

9. The braking control apparatus according to claim 8, wherein
in a case where a difference between a required hydraulic braking force that is a required value for controlling the hydraulic braking system and the hydraulic braking force that the hydraulic braking system is imparting to the vehicle is a correction target difference, the completion condition includes a condition that the correction target difference becomes smaller than a determination value.

10. The braking control apparatus according to claim 9, wherein
in a case where a value at a time when the correction target difference becomes maximum after a start of the correction process is a correction target difference maximum value, the determination value is reduced as the correction target difference maximum value decreases.

11. The braking control apparatus according to claim 8, wherein the completion condition includes a condition that a deceleration of the vehicle decreases in accordance with a reduction in the brake operation amount.

12. The braking control apparatus according to claim 8, wherein
the completion condition includes a condition that a reduction of the hydraulic pressure in the wheel cylinder has been detected.

13. The braking control apparatus according to claim 8, wherein
the completion condition includes a condition that a correction period elapses after the correction process is started.

14. The braking control apparatus according to claim 1, wherein
the hydraulic braking system is configured to interrupt an inside of a master cylinder that generates a hydraulic pressure according to the brake operation amount from an inside of the wheel cylinder.

15. A braking control method for a vehicle, the vehicle including a drive regeneration imparting device, a hydraulic braking system and an electronic control unit, the drive regeneration imparting device being configured to impart a driving force or a regenerative braking force to the vehicle, the hydraulic braking system being configured to impart a hydraulic braking force to the vehicle by adjusting a hydraulic pressure in a wheel cylinder provided in a wheel, the braking control method comprising:

when the hydraulic braking force is reduced based on a reduction in brake operation amount that is an operation amount of a brake operation member, executing a correction process by the electronic control unit, the correction process being a process of reducing the regenerative braking force that is being imparted to the vehicle by the drive regeneration imparting device.

* * * * *